United States Patent [19]

Bokros

[11] 4,005,163
[45] Jan. 25, 1977

[54] CARBON BEARINGS VIA VAPOR DEPOSITION

[75] Inventor: Jack C. Bokros, San Diego, Calif.

[73] Assignee: General Atomic Company, San Diego, Calif.

[22] Filed: Aug. 23, 1974

[21] Appl. No.: 500,026

[52] U.S. Cl. .................................. 264/81; 252/12; 264/139

[51] Int. Cl.² .................... B29C 13/00; C10M 7/04

[58] Field of Search ......... 264/60, 67, 81, DIG. 36, 264/62, 139; 252/12

[56] References Cited

UNITED STATES PATENTS 3,723,359  3/1973  Borg et al. ........................... 264/60

FOREIGN PATENTS OR APPLICATIONS 1,163,979  9/1969  United Kingdom ................. 264/60

Primary Examiner—Donald J. Arnold
Assistant Examiner—John Parrish
Attorney, Agent, or Firm—Fitch, Even, Tabin & Luedeka

[57] ABSTRACT

Bearing or seal devices are made by coating graphite substrate material with carbon by a vapor deposition process and selectively removing this vapor-deposited carbon from a portion of the coated substrate to expose the underlying graphite. A strong, self-lubricating surface adapted for contact with a relatively movable object is produced.

13 Claims, 9 Drawing Figures

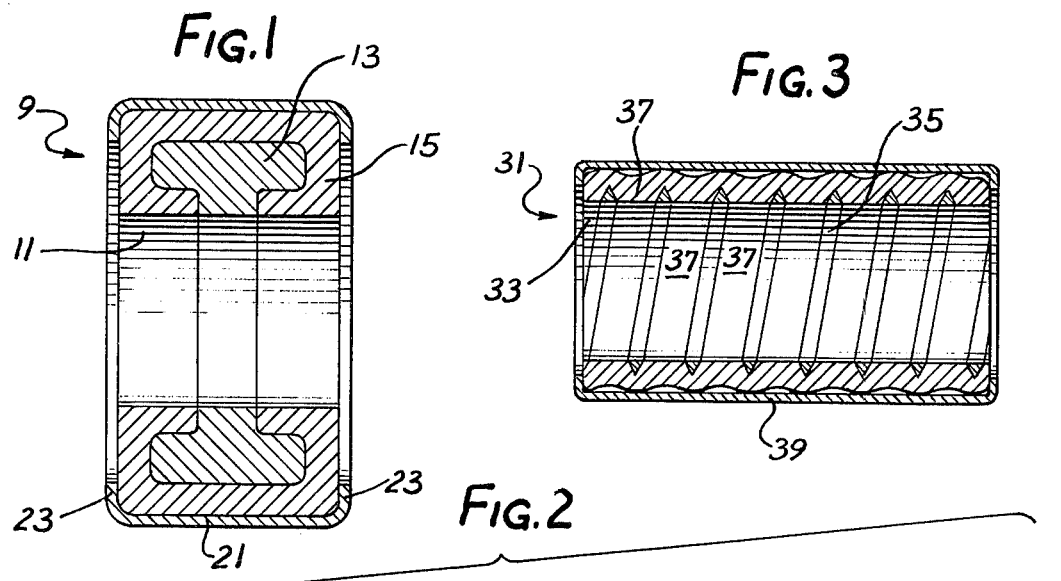
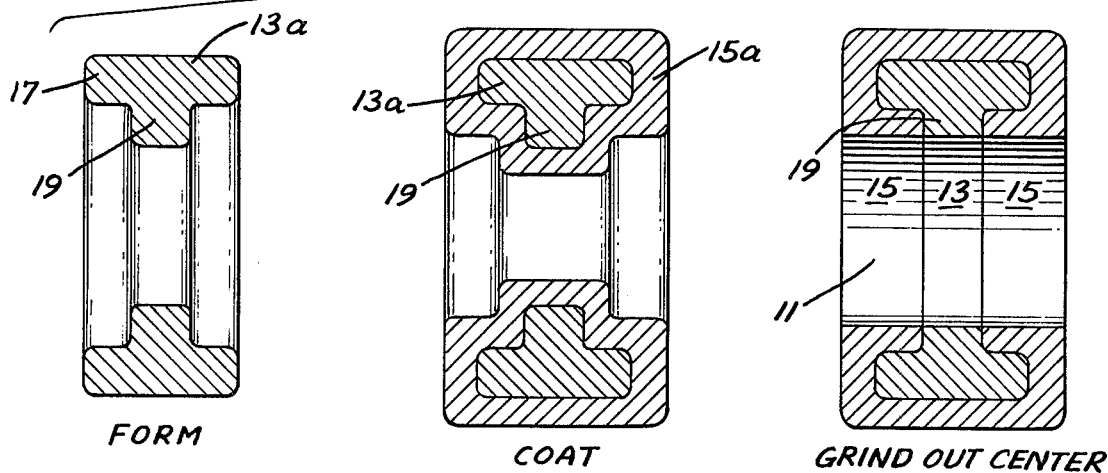
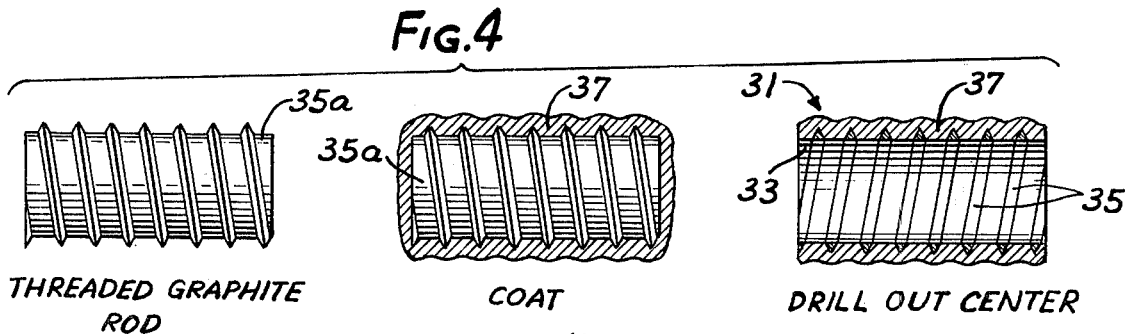
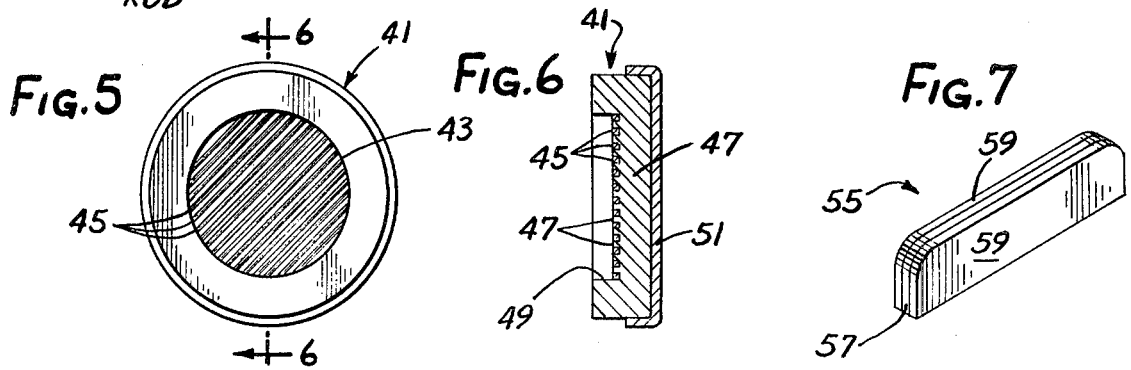

CARBON BEARINGS VIA VAPOR DEPOSITION

This invention relates to bearings and seals and more particularly to self-lubricating bearings and seals which utilize graphite.

Most carbonaceous bearings available today are made of a conglommerate of hard, nongraphitic carbon plus soft, lubricating graphite. Such bearings are generally fabricated by mixing appropriate powders together with suitable binders and then baking for a time sufficient to provide a hard, structurally strong product. However, bearings made by such powder technology are relatively weak and often do not have sufficient strength to permit utilization in many applications.

It is an object of the present invention to provide bearings and seals having improved physical properties. Another object of the invention is to provide a method for making strong, self-lubricating composite bearings and seals which will retain precise dimensions as a result of the characteristics of the nongraphitic carbon portion of the composite. Still another object is to provide devices having bearing or sealing surfaces which are self-lubricating and exhibit longevity of useful life. A further object of the invention is to provide self-lubricating bearings having long life and capable of use in applications requiring substantial structural strength.

These and other objects of the invention will be apparent from the following detailed description of methods for making bearings and seals embodying various features of the invention, when read in conjunction with the accompanying drawings wherein:

FIG. 1 is a sectional view through a composite bushing having various features of the invention;

FIG. 2 is a diagrammatic view showing a sequence of steps which might be employed in making the bushing of FIG. 1;

FIG. 3 is a sectional view of another bushing embodying various features of the invention;

FIG. 4 is a diagrammatic view illustrating a sequence of steps which might be employed in forming the bushing of FIG. 3;

FIG. 5 is a front view of a thrust bearing embodying various features of the present invention;

FIG. 6 is a sectional view taken generally along the line 6—6 of FIG. 5;

FIG. 7 is a perspective view of a simple seal embodying various features of the invention;

It has been found that bearings or seals of excellent physical characteristics can be produced by vapor-depositing carbon upon substrates of graphite having lubricating properties. A graphite substrate may be used which is proportioned so that, after the coating operation is complete, the coated substrate can be machined to form the bearing or seal surface of the shape desired. Alternatively, pyrocarbon-coated graphite particles may be used to fill a matrix that will form the bearing or seal device. An appropriate amount of the graphite substrate is exposed in the machining operation to create the self-lubricating contact or bearing surface. The composite bearing or seal device which is created advantageously mates the substantial structural strength provided by vapor-deposited carbon with the self-lubricating properties provided by the exposed surface area of the graphite substrate to result in a superior end product.

Generally, bearings or seals for use in contact with relatively movable surfaces can be made in any desired size and shape, consistent with available apparatus for applying vapor-deposited carbon coatings. Such coatings are preferably employed in a fluidized-bed coating apparatus, although other vapor-deposition coating processes well known in the art may also be used. U.S. Pat. No. 3,399,969, issued Sept. 3, 1968 to Jack C. Bokros et al., discloses a suitable method for applying vapor-deposited pyrolytic carbon coatings to graphite substrates. Although pyrolytic vapor-deposition is generally preferred, other vapor-deposition processes may be used; for example, carbon can be suitably vaporized, as by electron beam heating, in a high vacuum.

Artificial graphite is usually employed because it is readily available and easier to shape than natural graphite. The artificial graphite should have a density of at least about 1.5 g/cm$^3$ in order to assure the desired long life of the composite product.

In order to provide the desired lubrication, graphite is provided at the contact surface of the bearing or seal, and it is felt that graphite should constitute a minimum of about 1 percent of the surface area of the contact surface. Usually, the bearing or seal will be designed so that the exposed graphite substrate will constitute between about 10 and about 50 percent of the total surface area of the contact surface.

The pyrolytic carbon portion of the bearing or seal contributes to the structural strength of the composite product, particularly in the embodiments depicted in FIGS. 1, 3, 6 and 7. The overall design is generally such that the pyrolytic carbon portion substantially surrounds or envelops the graphite substrate, with the exception of the exposed portions at the contact surface. In this manner, advantage is taken of the superior structural properties of the vapor-deposited pyrolytic carbon to support the intimately associated graphite.

Figure 8:
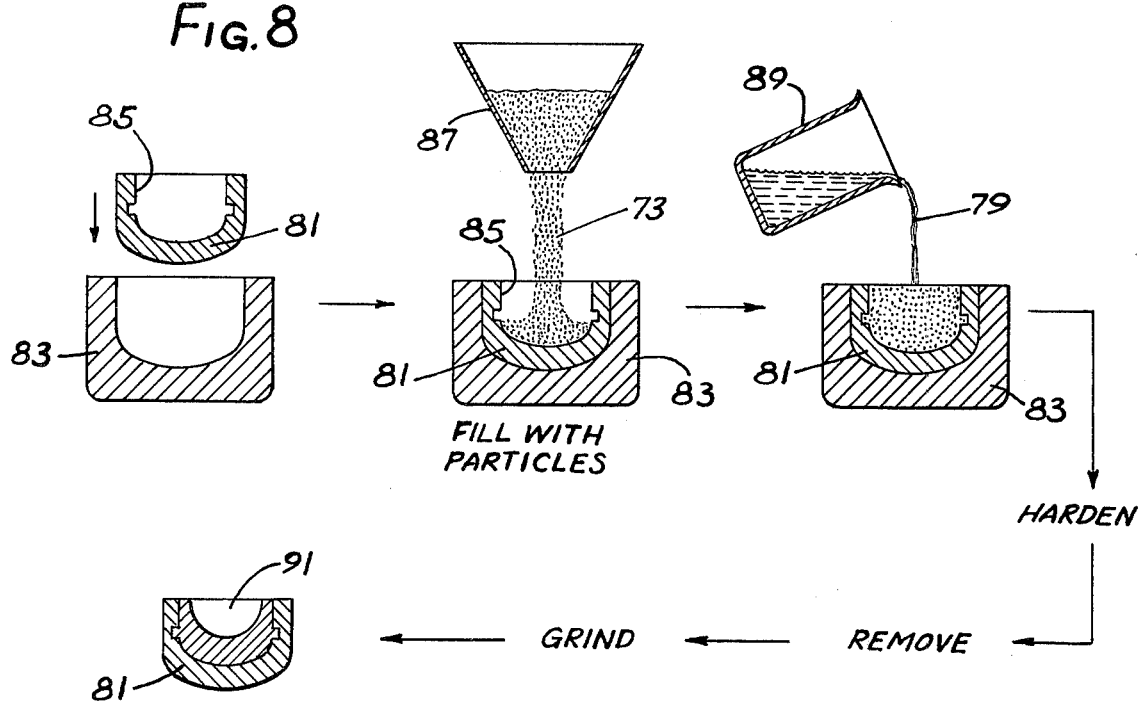
FIG. 8 is a diagrammatic view illustrating another sequence of steps for fabricating a socket embodying various features of the invention.
Figure 9:
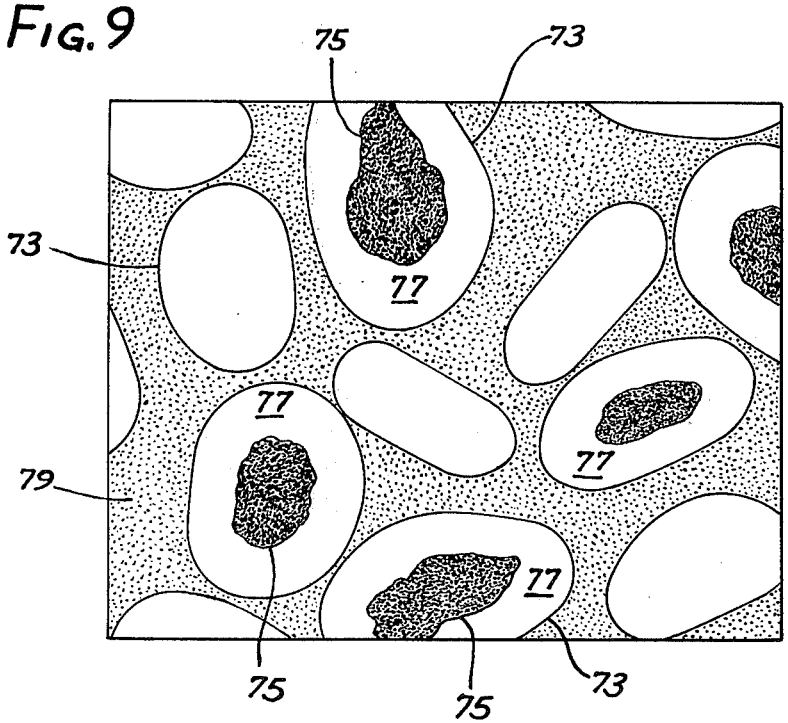
FIG. 9 is a view showing a portion of the contact surface of the FIG. 8 device, magnified about 50 times.

In order to take full advantage of the strength of the pyrolytic carbon, which will be deposited from a vapor atmosphere at a temperature above 1000° C., the coefficient of thermal expansion (CTE) of the graphite substrate should be complementary to the CTE of the pyrolytic carbon. In this respect, it is preferred that the CTE of the graphite substrate should slightly exceed the CTE of the vapor-deposited pyrolytic carbon so that, upon cooling to the ambient temperature, the graphite substrate will pull or draw the enveloping carbon inward as it contracts, thereby partly placing the carbon in compression and increasing its physical structural strength. Of course, all bearing and seal shapes may not be conducive to such creation of compressive stress in the pyrolytic carbon, and such stress is not of great significance when particles are used as depicted in FIGS. 8 and 9. However, as a general rule, creation of such stress is preferred when possible. With the foregoing in mind, a graphite is chosen which has a density greater than about 1.5, and a CTE between 4 and $9 \times 10^{-6}/°$ C., as the CTE of pyrolytic carbon in the range of primary interest is about $3-6 \times 10^{-6}/°$ C. Specialty graphites having these physical characteristics and which are additionally nearly perfectly isotropic are marketed in the United States by the Poco Graphite Company and by Great Lakes Carbon Company.

From the standpoint of matching the CTE's of the graphite and the pyrolytic carbon, isotropic graphite and isotropic pyrolytic carbon are generally chosen. However it might be possible to employ laminar pyrolytic carbon if nonisotropic graphite is used for the substrate. The thickness of the pyrolytic carbon should be at least about 25 microns and may be as high as several millimeters. Although greater thicknesses can be used, the deposition of pyrolytic carbon from a vapor atmosphere requires substantial production time, and therefore thicknesses greater than necessary are not normally employed.

The pyrolytic carbon should provide high structural strength and also good wear-resistance. The pyrolytic carbon should have a density of at least about 1.5 g/cm$^3$ and preferably at least about 1.7 g/cm$^3$, and it should preferably have a hardness of at least about 200 DPH as measured using a 50 gram load (which is the standard diamond pyramid hardness test). Because isotropic pyrolytic carbon exhibits the same CTE in all directions, it is preferred, and generally the isotropic carbon employed will have a BAF of 1.3 or less. The BAF (Bacon Anisotropy Factor) is an accepted measure of preferred orientation of the layer planes in the carbon crystalline structure. The technique of measurement and a complete explanation of the scale of measurement is set forth in an article by G. E. Bacon entitled "A Method for Determining the Degree of Orientation of Graphite" which appeared in the *Journal of Applied Chemistry*, Volume 6, Page 477 (1956). For purposes of explanation, it is noted that 1.0 (the lowest point on the Bacon scale) signifies perfectly isotropic carbon. Moreover, from a standpoint of structural strength and wear-resistance, pyrolytic carbon having relatively small crystallite size, i.e., a crystallite size less than about 100A. is preferred; and most preferably, carbon having a crystallite size less than 50A. is used.

Isotropic pyrolytic carbon having these properties can be deposited from an atmosphere containing an inert diluent, such as argon or helium, and a hydrocarbon such as propane, propylene or butane at temperatures generally in the range of about 1200° C. to about 1500° C. From the standpoint of strength and wear-resistance, it is advantageous to alloy the pyrolytic carbon with minor amounts of silicon, zirconium or some other carbide-forming additive which will not detract from the desirable properties of the isotropic pyrolytic carbon but will enhance the wear-resistance and overall structural strength. Silicon in an amount up to about 50 weight percent, based upon total weight of silicon plus carbon, may be included; and like amounts of zirconium or other carbide-forming additives may also be used. Generally, the additive is employed in an amount between about 10 and 30 weight percent. Other examples of carbide-forming additives include tungsten, tantalum, titanium, niobium, vanadium, molybdenum, boron and hafnium. As described, for example, in U.S. Pat. No. 3,685,059, issued Aug. 22, 1972 to Jack C. Bokros el al., the carbide-forming additive is codeposited along with the pyrolytic carbon by selecting a volatile compound of the element in question and supplying this compound to the vapor deposition region. Usually, the inert gas stream which is employed in the pyrolytic vapor deposition procedure is conveniently employed to carry the volatile compound to the deposition region.

Illustrated in FIG. 1 is a bushing 9 designed to accommodate a rotating shaft and thus having a central cylindrical surface 11 where the contact between the shaft and the bushing occurs. The bushing 9 is generally in the form of a sleeve having a central graphitic portion 13 which is totally surrounded by an outer pyrocarbon portion 15, except for a part of the region which constitutes the cylindrical contact surface 11.

FIG. 2 illustrates a preferred method of making the bushing 9 wherein a graphite substrate 13a is initially provided having the desired dimensions. The substrate 13a has the form of an annular ring 17 which has a radial rib 19 formed on the interior surface thereof. The graphite substrate 13a may be formed from isotropic artificial graphite 15 obtained from the Poco Graphite Company having a density of about 1.8 g/cm$^3$ and a CTE of about 8 × 10$^{-6}$/° C.

As an example of the coating process, such a substrate is placed in a fluidized bed coater which includes a vertical graphite tube having an internal diameter of about 9.0 centimeters and is levitated in an upward flowing stream of helium and heated to a temperature of about 1350° C. An ancillary charge of about 100 grams of zirconium dioxide particles (to provide additional available deposition surface area) having an average particle size of about 300 microns are added to the reaction tube. When coating is ready to begin, propane gas is admixed with the helium to provide a partial pressure of propane of about 0.4 atmosphere (total pressure of 1 atmosphere). The total flow of gas is held at about 18,000 cc. per minute, and all of the helium is bubbled through a bath of methyltrichlorosilane. The propane and the methyltrichlorosilane pyrolyze and deposit a mixture of isotropic carbon and silicon carbide on the substrate. Deposition is continued until a coating 15a of about 0.5 mm. thick is obtained, a time of about 80 minutes.

After cooling, examination shows that the carbon coating 15a is isotropic, having a BAF of about 1.1, and that the apparent crystallite size of the pyrolytic carbon crystals is about 35A. The density of the isotropic carbon-silicon carbide alloyed coating is about 2 g/cm$^3$, and the CTE is about 6 × 10$^{-6}$/° C. As a result of the contraction which occurs during the cooling from the deposition temperature of about 1350° C. to ambient, a substantial circumferential compressive stress is set up in the coating, and the resultant coated graphite substrate exhibits excellent structural strength and may be repeatedly dropped without fracture.

As illustrated in FIG. 2, the central portion of the coated substrate 13a is then ground away to remove all of the pyrolytic carbon coating 15a interior of the radial rib portion 19 and also the innermost part of the rib itself. The grinding provides the cylindrical contact surface 11 which is made up of a central strip provided by the graphite substrate 13 which constitutes about 30 percent of the surface area and which is flanked on both sides by slightly wider strips of the pyrolytic carbon.

In order to facilitate mounting of the bushing in its operative environment, the exterior surface of the coated substrate may be ground slightly so that it will be accepted in a metal outer tubing 21 of predetermined size, the edges 23 of which are thereafter deformed or peened over the pyrolytic carbon portion to provide a protective cladding, which prevents chipping of the outer surface of the bushing during use. Moreover, if additional reinforcement is desired, the metal can be heated and then shrink-fit upon the coated substrate so as to assist in holding the pyrolytic carbon in compression. Bushings 9 made in this manner exhibit excellent wear-resistance and need no lubrication because of that inherently provided by the graphite portion of the contact surface 11.

FIGS. 3 and 4 illustrate a bushing 31 particularly suited for disposition about a sliding shaft, which may be characterized as elongated, compared to the bushing 9 illustrated in FIG. 1. The bushing 31 has a central cylindrical contact surface 33 which has a spiral graphite band 35 extending throughout its length, with the remainder 37 of the surface being isotropic pyrolytic carbon. The bushing 31 is formed from a substrate 35a in the form of a graphite rod having external threads.

The rod 35a is coated under the same conditions as indicated above with respect to the annular rib-carrying graphite substrate to deposit a coating 37 about 0.5 mm. thick covering the entire surface. Thereafter, the entire center of the coated rod 35a is drilled out so that only the original threads remain, and the ends of the coated threaded rod are preferably ground flat. As a result, the contact surface 33 is produced wherein what was originally the graphite thread, appears as a spiral band 35 separated by a wider spiral band of pyrolytic carbon 37. The coated, drilled and ground substrate is then similarly disposed within an outer metal cladding 39, both to provide protection and a surface which is free of the inherent undulations which would result from the vapor deposition process.

The bushing 31 has the graphite spiral band 35 uniformly distributed along its entire length of the contact surface. Such a bushing wherein the graphite spiral band 35 constitutes about 25 percent of the contact surface area provides an excellent bearing surface for a sliding shaft; and it could also be employed as a bushing for a rotating shaft.

Shown in FIGS. 5 and 6 is a thrust bearing 41 made of a composite of graphite and pyrolytic carbon. The circular bearing contact surface 43 is formed by a plurality of alternating strips of graphite 45 and pyrolytic carbon 47.

The thrust bearing 41 may be fabricated by first providing a circular disk of artificial graphite and machining therein a plurality of parallel grooves, so as to leave a plurality of parallel ridges of graphite (which serve the same purpose as the upstanding threads on the graphite rod 35a shown in FIG. 4). The grooved disk is coated with isotropic pyrolytic carbon, and the carbon fills in the grooves. Coating is continued until a deposit of the desired thickness is achieved. Subsequently, machining of the coated substrate is carried out to grind the circular recess 49, shown in FIG. 6, by removing all of the graphite disk substrate with the exception of the ridges, which in the final product appear as the parallel strips of graphite 45. The remainder of the pyrolytic carbon surface is then suitably machined and clad with a metal cladding 51. A thrust bearing may also be efficiently fabricated using the method depicted in FIG. 8 and described hereinafter.

Depicted in FIG. 7 is one example of a simple seal 55 made of a composite of graphite and pyrolytic carbon. The seal 55 includes a center layer or zone 57 of artificial graphite which is sandwiched between a pair of outer layers or zones 59 of pyrolytic carbon. The seal 55 can be simply produced by coating a flat plate of graphite of the desired proportions with pyrolytic carbon to the desired thickness of the flanking layers 59. After coating is completed, the edges are suitably machined to provide the contact surface configuration desired wherein the central graphite strip 57 is substantially surrounded by the flanking pyrocarbon strips 59. The illustrated seal 55 is designed to seal along the upper and the two side surfaces (as illustrated in FIG. 7); however, it should be understood that seals of any shape can be produced and will have the desired self-lubricating qualities. The seals may themselves be carried by a moving or rotating object or may be carried by a stationary object and bear against a movable object. Seals may also be made using the method described immediately hereinafter.

Illustrated diagrammatically in FIG. 8 of the drawings is an alternative process for making bearing or seal devices embodying various features of the invention. Generally, this process utilizes small particles of graphite which may be of any shape, for example, spheroidal or irregular. The graphite particles are coated with strong pyrolytic carbon using any known methods, for example, in a fluidized bed coater. The particles are then dispersed relatively uniformly within a moldable matrix material, for example, a molten metal or a polymeric material, that will harden or solidify into a rigid dimensionally firm product. Machining, as by grinding, is then carried out to produce the bearing contact surface that will have the precise dimension. During the machining step, the pyrolytic carbon coatings of many of the particles will be removed to such an extent that the graphite substrates are exposed.

Depicted in FIG. 9 is a drawing which is illustrative of a product made in this manner magnified some fifty times. The drawing depicts particles 73 having inner substrates 75 coated with pyrolytic carbon 77 disposed relatively uniformly within a surrounding matrix 79. As shown, the grinding of an exterior layer of the product to produce the contact surface results in the removal to varying degrees of the pyrolytic carbon coatings 77 of the particles. Statistically, depending upon the amount of particles 73 employed, the extent of the area of the graphite substrates which will be exposed can be calculated. As a result, by varying the relative amount of the particles 73 employed, the desired percentage of graphite can be achieved which will provide the self-lubricating feature, usually at least about 10 percent of the surface area is graphite.

FIG. 8 depicts diagrammatically the making of a socket for a ball joint or the like wherein an insert 81 is first placed in a casting mold 83. The insert 81 has a central cavity 85 which is then filled with pyrolytic carbon-coated graphite particles 73 from a suitable supply hopper 87. Thereafter, a suitable source 89 of the matrix material 79 in liquid state is added to the particle-filled cavity 85 and allowed to harden or solidify. Any suitable liquid hardenable material may be employed, for example, a molten metal, such as aluminum, may be used. Alternatively, a polymeric material, such as a heated thermoplastic material, e.g., polyethylene, or a thermosetting material, e.g., a mixture of an epoxy resin plus hardener, may be used. Depending upon the viscosity of the matrix material which will be employed, and the percentage of the particles to be incorporated, it may be preferable to use a vacuum impregnation technique or to first mix the particles 73 with the liquid matrix material 79 and then fill the cavity in the insert 81 with the particle-matrix mixture.

The design of the insert 81 should be such that, after hardening and removal from the casting mold 83, the particle-matrix material will be securely bound and attached to the insert, as by providing undercuts or the like. Subsequent machining, as by grinding, is carried out to provide a generally hemispherical recess 91 in the matrix-filled insert 81. The hemispherical socket provides a bearing surface for a ball in a ball-and-socket joint arrangement.

The above-described process can be employed to produce bearing and seal surfaces of substantially any design wherein the graphite will be dispersed throughout on a random pattern. The individual graphite particles used are generally less than 1 mm. and are usually between about 100 and about 500 microns. The pyrolytic carbon particle coatings 77, which may be about 25 and about 200 microns thick and have a density of usually at least about 1.5 g/cm³, individually encapsulate the structurally weaker, lubricating graphite substrates 75 and thus allow considerable latitude in the selection of the graphite substrate material because the coatings will maintain the integrity of the encapsulated graphite substrates.

The strength of the final product will generally be dependent upon the matrix material 79, the size of the particles and the concentration thereof. The matrix material is chosen to suit the particular application for which the product will be employed. For example, an epoxy material may be chosen if a strong, self-lubricating bearing device is desired. Other softer polymeric materials or a molten metal, such as aluminum, may be employed if a softer material is desired, for example, in a case of some seal devices.

Although the invention has been described and illustrated with particular respect to certain preferred embodiments, it should be understood that certain modifications as would be obvious to those having the ordinary skill in the art are considered as coming within the scope of the invention which is defined by the appended claims. Various features of the invention are set forth in the claims which follow.

What is claimed is:

1. A method of making a bearing or seal device comprising coating lubricating graphite substrate material with nongraphitic carbon at least about 25 microns thick by a vapor deposition process, and selectively removing said vapor-deposited carbon from a portion of said coated substrate to expose the underlying graphite and produce a strong, self-lubricating surface adapted for contact with a relatively movable object, said lubricating graphite constituting at least about one percent of said surface.

2. A method in accordance with claim 1 which said graphite substrate is an annular ring having a radial rib formed on the internal surface thereof.

3. A method in accordance with claim 1 wherein said graphite substrate is an externally threaded rod and wherein said device is formed by removing the internal portion of the graphite substrate outward to the threads.

4. A method in accordance with claim 1 wherein said graphite substrate has a coefficient of thermal expansion between about 4 and 9 × 10⁻⁶/° C. and said carbon is deposited by pyrolytic decomposition.

5. A method in accordance with claim 1 wherein said graphite substrate is in the form of a plurality of small particles, wherein said device is formed by surrounding said coated particles within a solidifiable matrix material, and removing a sufficient portion of the particle-containing solidified matrix including portions of the individual vapor-deposited carbon coatings to provide a contact surface which is constituted in part by the individual coated particle substrates.

6. A method in accordance with claim 1 wherein said graphite substrate is a disk that has a plurality of grooves in one surface thereof which create a plurality of ridges of graphite therebetween, and wherein the remainder of said disk with the exception of said ridges is removed along with the selective removal of said carbon, leaving said ridges in the final product which form alternating parallel strips with said vapor-deposited carbon.

7. A method in accordance with claim 4 wherein said pyrolytic carbon has a crystallite size of not more than about 100A.

8. A method in accordance with claim 4 wherein said graphite is isotropic graphite and said pyrolytic carbon has a Bacon Anisotropy Factor of not more than about 1.3.

9. A method in accordance with claim 1 wherein said carbon is pyrolytic carbon containing between about 1 and about 50 weight percent of a carbide-forming element dispersed as an alloy uniformly therethroughout.

10. A method in accordance with claim 8 wherein said carbon has a hardness of at least about 200 DPH measured by the standard diamond pyramid hardness test using a 50 gram load.

11. A method in accordance with claim 3 wherein a reinforcing metal jacket is placed in encircling relation about said vapor-deposited carbon structure.

12. A method of making a bearing or seal device comprising coating a plurality of particles of lubricating graphite material with nongraphitic carbon at least about 25 microns thick by a vapor-deposition process, filling a mold with a mixture of said coated particles plus a liquid solidifiable material, hardening said mixture to provide a structure wherein said coated particles are distributed throughout a solidified matrix, and then removing a portion of the overall particle-containing matrix in a manner to expose said underlying graphite particle substrate and provide a self-lubricating surface adapted for contact with a relatively movable object, said lubricating graphite constituting at least about 1 percent of said surface.

13. A method in accordance with claim 12 wherein said mold is first filled with said coated particles and said solidifiable matrix material is then added to said coated particles within said mold.

* * * * *